3,195,917
FIXED OR VARIABLE WHEEL-BASE TANDEM AXLE MECHANICAL SUSPENSIONS HAVING HYDRAULIC LOAD-EQUALISER MEANS FOR SEMI-TRAILERS
Kenneth William Holmes Baldock, Bentleigh, Victoria, Australia, assignor to Trailmobile Inc., Cincinnati, Ohio
Filed Sept. 25, 1963, Ser. No. 311,580
5 Claims. (Cl. 280—104.5)

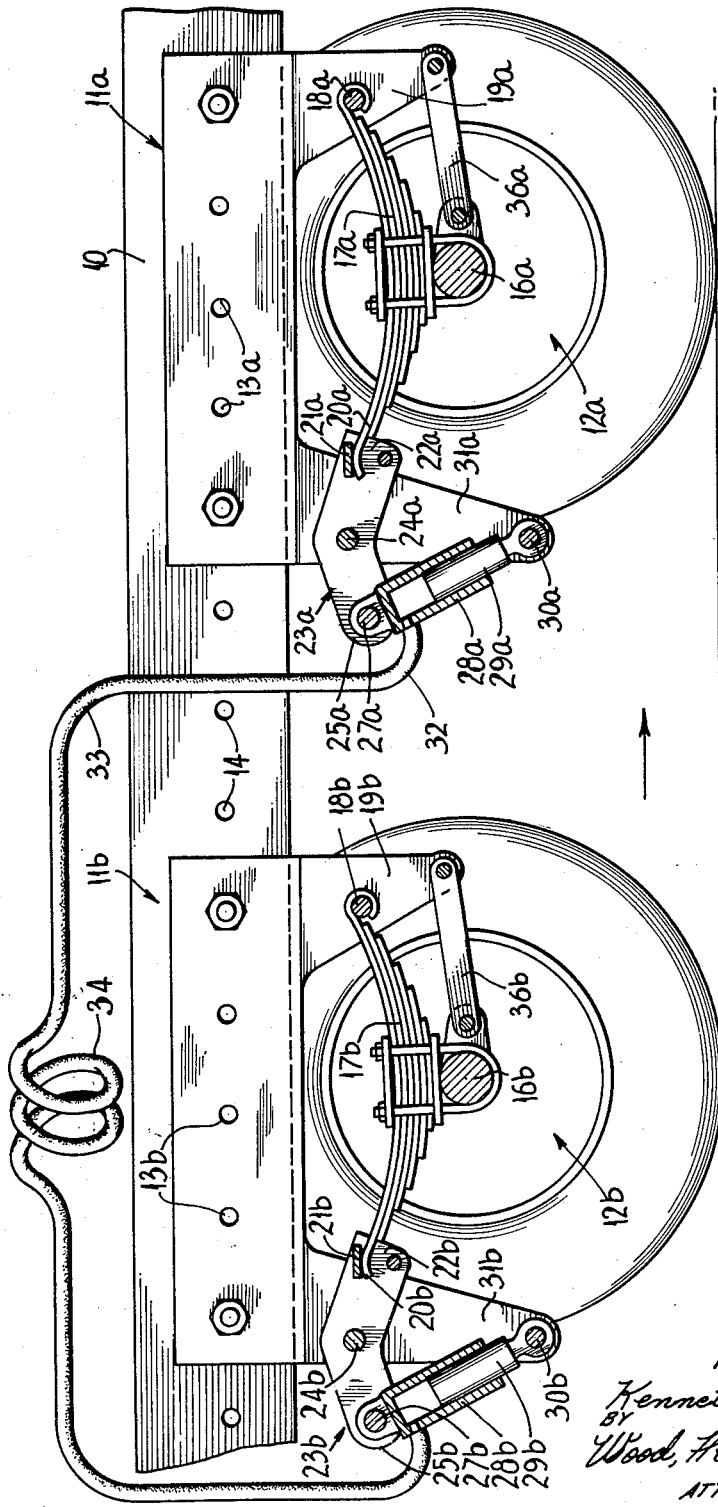

This invention relates to fixed wheelbase or variable wheelbase tandem axles, and more particularly to their application to mechanical suspension for semi-trailers wherein hydraulic load-equaliser means is employed.

It is known in tandem axle suspension systems to employ means connecting the two axle assembles whereby the load is equalised between the two axles. Such an arrangement may comprise two axle assemblies each having a pair of half-elliptic springs, the forward end of each such spring of one assembly having a bearing in one end of a rocker, and the rearward end of the corresponding spring of the other assembly having a bearing in the other end of the said rocker, the rocker thus equalising the loads on the two axles by transfer through the rocker.

Alternatively, both rear ends (or both forward ends) of the said corresponding half-elliptic springs may be supported one at each end of the said rocker, by which arrangement not only is the axle-load equalised but the braking torque reaction on one axle is opposed by the braking torque reaction on the other axle.

It is also known to transfer both load and braking torque reaction forces from one axle assembly to the other by hydraulic means in which the suspension of each axle is directly supported by a plunger operating in a cylinder at each end of a closed hydraulic system. However, such direct acting plunger-in-cylinder hydraulic arrangements present problems associated with controlling the multi-directional spring end loads and are subject to considerable wear and maintenance costs.

To avoid these disadvantages the present invention provides a tandem axle mechanical suspension for semi-trailers comprising a first axle assembly and a second axle assembly, each having conventional half-elliptic supporting springs, one on each side of the vehicle, one end of each supporting spring being carried by a bearing in one arm of a co-operating rocker pivoted in the respective assembly, the other arm of each rocker of the first assembly being operatively connected to the corresponding other arm of the rocker of the second assembly on the same side of the vehicle by a closed hydraulic system including an inter-connecting conduit to provide an axle-load equalising means.

It is sometimes desirable, and even necessary, to vary the distance between the axles of a tandem axle suspension system, since in some states the road laws allow greater axle loads for increased wheelbase of a semi-trailer, and it is an object of the present invention to provide optional means for achieving this desideratum, whilst retaining the features and advantages of the hydraulic load-equaliser device above defined.

With this object in view the invention further contemplates a variable wheelbase tandem axle mechanical suspension for semi-trailers comprising a first axle assembly and a second axle assembly, each having conventional half-elliptic supporting springs, one on each side of the vehicle, one or both such assemblies being locatable and fixable in a number of fore-and-aft positions relative to the vehicle, whereby the distance between the axle centers and their fore-and-aft position relative to the trailer can be altered and consequently the wheelbase of the suspension is variable as to extent and location, one end of each supporting spring being carried by a bearing in one arm of a co-operating rocker pivoted in the respective assembly, the other arm of each rocker of the first assembly being operatively connected to the corresponding other arm of the rocker of the second assembly on the same side of the vehicle by a closed hydraulic system including an inter-connecting non-rigid conduit adapted to accommodate the variable distance between the two axle assemblies so as to provide an axle-load equaliser means.

In one embodiment of the invention, one or both of the axle assemblies is supported in a sub-frame adapted to be slidable fore and aft in the chassis frame of the semi-trailer, there being holes in the sub-frame which register in a number of positions with a series of holes in the vehicle chassis whereby the sub-frame may be bolted, or otherwise secured, in any one of the said positions.

Of course, if the axles are fixed, the above described arrangement does not apply, both assemblies being permanently attached to the chassis.

Each axle assembly is provided with a rocker on each side of the vehicle pivotally mounted in the respective assembly, and one end preferably the rear end of the half-elliptic spring on each said side is carried by a bearing in one arm of the rocker.

The other arm of each rocker on each side of the vehicle is pivotally connected to a plunger-in-cylinder device interconnected by flexible tubing to form a two-way closed hydraulic system.

Preferably the operative units of the plunger-in-cylinder device consist of an elongated plunger or ram slidably mounted in an elongated cylinder to form a telescopic guide (in addition to its hydraulic function), one unit being pivotally connected to the said other arm of the respective rocker whilst the other unit is pivotally connected to a convenient part of the respective axle assembly.

By this arrangement the mechanical rockers absorb all transit reactions leaving the hydraulic set-up to function solely in its hydraulic capacity.

One practical arrangement of the invention will now be described with reference to the accompanying drawing, which depicts an off-side fragmentary view of part of a trailer including a tandem axle suspension having hydraulic load-equaliser means according to the invention.

Referring to the drawing, the main chassis frame 10 of the trailer has mounted thereon a first sub-frame 11a carrying a first axle assembly 12a, and a second sub-frame 11b carrying a second axle assembly 12b. The sub-frames 11a, 11b, may be arranged to be slidable fore and aft in the main frame 10, there being holes 13a, 13b, in the sub-frames which register in a number of positions with a series of holes 14 in the main frame, whereby the sub-frames 11a, 11b, can be selectively bolted, or otherwise secured, to the main frame 10 in any of the said positions.

By this arrangement the distance between the first and second axle assemblies (and consequently between the respective axle centers of the said assemblies), and their fore-and-aft position relative to the main frame 10 of the trailer, can be altered. Thus, the wheelbase of the suspension of the trailer is variable as to extent and location.

As the axle assemblies 12a and 12b are substantially identical, a description of one will apply to both, as follows.

The road-wheel axle 16a (16b) supports the main frame 10 through a conventional half-elliptic spring 17a (17b) at each side of the vehicle. Since the suspension arrangement according to the invention is substantially similar with respect to both sides of the vehicle, the details now to be described will refer to the off-side, as shown in the drawing.

The forward end 18a (18b) of the spring 17a (17b) is mounted for pivoting in a bracket 19a (19b) rigid with the sub-frame 11a (11b). The rear end 20a (20b) of said spring is carried by a bearing 21a (21b) in one arm 22a (22b) of a rocker (23b), which latter is pivotally mounted on the sub-frame 11a (11b) at 24a (24b).

The other arm 25a (25b) of the rocker 23a (23b) is pivotally connected at 27a (27b) to a hydraulic cylinder 28a (28b) which slidably engages a hydraulic plunger 29a (29b). The plunger 29a (29b) is pivotally connected at its outer end at 30a (30b) to an extension 31a (31b) of the sub-frame 11a (11b).

Obviously, the relative positions of the cylinder and plunger could be reversed, if desired, without affecting the functioning of the device.

Preferably the plunger 29a (29b) is elongated and operates in a corresponding elongated cylinder 28a (28b), so as to form a telescopic guide means in addition to their hydraulic function now to be described.

The hydraulic cylinder 28a of axle assembly 12a is in hydraulic communication with hydraulic cylinder 28b of axle assembly 12b by means of flexible tubing 33 to constitute a two-way closed hydraulic system, indicated generally by 32.

In the case of a fixed wheel-base tandem alxle suspension system the flexibility of the tubing 33 need only accommodate the relatively small movement of the rocker arms 25a, 25b, which, of course, is followed by the cylinders 28a, 28b.

In the case of a fixed wheel-base tandem axle suspenbility of the tubing 33 must either be increased, or other equivalent means introduced, so as to accommodate, in addition to the above stated need, the difference between the maximum and minimum distance apart the two axle assemblies can be spaced in accordance with the holes 13a, 13b and 14. This is simply achieved by including in the line of tubing 33 a series of loops 34 or one large loop if more convenient.

Winding the tubing 33 into helical coils for the greater part of its length provides ample flexibility for all practical purposes.

From the drawing and the foregoing description, it will be seen that a load applied at axle 16a will be transferred through the spring 17a to the regions at the spring extremities, 18a and 20a. The spring end 18a being pivotally mounted in the rigid bracket 19a, the load will tend to rotate the rocker 23a in an anti-clockwise direction, brought about by upward pressure on the bearing 21a, with a resultant downward pressure at 27a on the rocker arm 25a. This pressure is communicated to the cylinder 28a and thence to the hydraulic system 32.

As the system 32 is closed, like pressure is automatically operative in the cylinder 28b of the axle assembly 12b and tends to rotate the rocker 23b in a clock-wise direction, communicating the load to the spring 17b and thence to the axle 16b.

The reverse process is, of course, operative if we assume that the load is first applied at axle 16b; it is communicated through the hydraulic system 32 to axle 16a.

Thus, a load applied at either of the tandem axles of the semi-trailer will be automatically substantially equalised between the two axles.

In the example taken, the breaking torque reaction on one axle is opposed by the breaking torque reaction on the other axle, and equalised with respect to the two axle assemblies 12a, 12b, by the hydraulic system 32 in like manner to that above described, since the braking torque will tend to turn both axle assemblies in a clockwise direction producing an additional upward pressure on both bearings 21a, 21b.

Preferably the pivotal connections 27a, 27b, between the cylinders and the rocker arms, and the pivotal connections 30a, 30b, between the plungers and the sub-frames, respectively, are of the semi-universal type, such as ball and socket mountings or rubber insert type, so as to relieve the device of all external stresses.

Each axle assembly may be provided with conventional radius rods 36a, 36b, for alignment and partial torque control, and may include known means for providing a degree of self-steering, (not shown in the drawing). When radius rods are employed, the forward ends 18a, 18b, of the springs may be mounted in a shackle or slipper-type bearing.

The rear ends of the half-elliptic springs 20a, 20b, may bear in the rocker arms 22a, 22b, in slipper-type mountings 21a, 21b, as shown, or shackle pivots, and may include rubber or like resilient mountings. A roller bearing at this point has been found advantageous to reduce friction.

The shape or proportions of the rockers 23a, 23b, is not limited to any precise form and in some arrangements they may resemble a half-rocker or a bell-crank according to the disposition of the plunger-in-cylinder device which may be oriented at any angle to suit convenience.

Other details may be varied without departing from the board concept of the invention as defined in the claims which follow.

I claim:

1. A variable wheelbase tandem axle mechanical suspension for semi-trailers comprising a main frame, a first axle assembly and a second axle assembly mounted on said main frame, each assembly having conventional half-elliptic supporting springs, one on each side of the vehicle, at least one of said such assemblies being locatable and fixable in a number of fore-and-aft positions relative to the vehicle, whereby the distance between the axle centers and their fore-and-aft position relative to the trailer can be altered and consequently the wheelbase of the suspension is variable as to extent and location, a cooperating rocker having projecting arms and pivotally mounted intermediate its ends on each assembly, one end of each supporting spring being carried by a bearing in one arm of said co-operating rocker, a closed hydraulic system, the other arm of each rocker of the first assembly being operatively connected to the corresponding other arm of the rocker of the second assembly on the same side of the vehicle by said closed hydraulic system so as to provide an axle-load equalising means, said closed hydraulic system including an interconnecting non-rigid conduit composed at least partly of flexible tubing formed with at least one loop so as to be extensible and retractable to accommodate the variable distance between the two axle assemblies.

2. A mechanical suspension according to claim 1, wherein each axle assembly is supported in a sub-frame mounted on the semi-trailer chassis frame, each half-elliptic spring being pivotally connected at its forward end to its relating sub-frame, the rear end of each said spring being carried by the bearing in one arm of the co-operating rocker, said rocker being pivotally mounted on the said relating sub-frame.

3. A mechanical suspension according to claim 2, wherein the closed hydraulic system comprises two operative units, namely, a hydraulic plunger slidable in a hydraulic clyinder, one unit being pivotally connected to the said other arm of the respective rocker whilst the other unit is pivotally connected to the relating sub-frame, the said conduit inter-connecting the interiors of the cylinders on the same side of the vehicle to provide hydraulic communication therebetween so that the closed hydraulic system operates in either direction of flow with equal effect.

4. A mechanical suspension according to claim 3, wherein the plunger and cylinder are elongated so as to provide a telescopic guide each for the other.

5. A mechanical suspension according to claim 4, wherein the pivotal connections of the two operative units to the rocker arm and sub-frame, respectively, are of a semi-universal type so as to afford a degree of angular freedom in all directions.

References Cited by the Examiner
UNITED STATES PATENTS

| | | | |
|---|---|---|---|
| 1,747,902 | 2/30 | Marcum | 280—104.5 |
| 2,225,016 | 12/40 | Mallett | 280—104.5 |
| 2,913,252 | 11/59 | Norrie | 280—104.5 |
| 3,004,772 | 10/61 | Bohlen | 280—80 |

A. HARRY LEVY, *Primary Examiner.*